US012586815B2

(12) United States Patent
Akatsuka et al.

(10) Patent No.: US 12,586,815 B2
(45) Date of Patent: Mar. 24, 2026

(54) SULFIDE-BASED SOLID ELECTROLYTE USED FOR LITHIUM ION SECONDARY BATTERY AND PRODUCTION METHOD FOR SAME, SOLID ELECTROLYTE LAYER, AND LITHIUM ION SECONDARY BATTERY

(71) Applicant: AGC Inc., Tokyo (JP)

(72) Inventors: Kosho Akatsuka, Tokyo (JP); Naoki Fujii, Tokyo (JP); Tetsushi Shobudani, Tokyo (JP); Manabu Nishizawa, Tokyo (JP); Hiroaki Tanaka, Tokyo (JP); Shinji Terazono, Tokyo (JP); Hideaki Hayashi, Tokyo (JP)

(73) Assignee: AGC Inc., Tokyo (JP)

( * ) Notice: Subject to any disclaimer, the term of this patent is extended or adjusted under 35 U.S.C. 154(b) by 556 days.

(21) Appl. No.: 18/150,925

(22) Filed: Jan. 6, 2023

(65) Prior Publication Data

US 2023/0198013 A1 Jun. 22, 2023

Related U.S. Application Data

(63) Continuation of application No. PCT/JP2021/025673, filed on Jul. 7, 2021.

(30) Foreign Application Priority Data

| Jul. 7, 2020 | (JP) | 2020-117194 |
| Jul. 31, 2020 | (JP) | 2020-130799 |
| Oct. 13, 2020 | (JP) | 2020-172693 |
| May 21, 2021 | (JP) | 2021-086406 |

(51) Int. Cl.
H01M 10/0562 (2010.01)
H01M 10/0525 (2010.01)

(52) U.S. Cl.
CPC ... H01M 10/0562 (2013.01); H01M 10/0525 (2013.01); H01M 2300/0068 (2013.01)

(58) Field of Classification Search
None
See application file for complete search history.

(56) References Cited

U.S. PATENT DOCUMENTS

| 2014/0302382 A1 | 10/2014 | Kambara et al. |
| 2015/0093652 A1 | 4/2015 | Aihara et al. |
| 2016/0156064 A1 | 6/2016 | Miyashita et al. |
| 2017/0187066 A1 | 6/2017 | Tsujimura et al. |
| 2017/0194662 A1 | 7/2017 | Kambara et al. |
| 2017/0229732 A1 | 8/2017 | Kanno et al. |
| 2018/0069262 A1 | 3/2018 | Utsuno et al. |
| 2018/0138546 A1 | 5/2018 | Sung et al. |
| 2018/0166740 A1 | 6/2018 | Iwasaki et al. |
| 2018/0351148 A1 | 12/2018 | Schneider et al. |
| 2018/0366777 A1 | 12/2018 | Sasaki |
| 2019/0074544 A1 | 3/2019 | Senga et al. |
| 2020/0087155 A1 | 3/2020 | Rupert |

| 2020/0381772 A1 | 12/2020 | Kim et al. |
| 2021/0020984 A1 | 1/2021 | Ito et al. |
| 2021/0119252 A1 | 4/2021 | Sung et al. |
| 2022/0006117 A1 | 1/2022 | Takahashi et al. |
| 2022/0109184 A1 | 4/2022 | Tsujimura et al. |
| 2022/0255188 A1 | 8/2022 | Schneider et al. |

FOREIGN PATENT DOCUMENTS

| EP | 4 084 123 A1 | 11/2022 |
| JP | 6-115911 A | 4/1994 |
| JP | 2012-43646 A | 3/2012 |
| JP | 2012-43654 A | 3/2012 |
| JP | 2012-54212 A | 3/2012 |
| JP | 2013-137889 A | 7/2013 |
| JP | 2013-211171 A | 10/2013 |
| JP | 2014-216217 A | 11/2014 |
| JP | 2015-232965 A | 12/2015 |
| JP | 2017-117753 A | 6/2017 |
| JP | 2017-142948 A | 8/2017 |
| JP | 2017-199631 A | 11/2017 |
| JP | 2018-45997 A | 3/2018 |
| JP | 2018-049834 A | 3/2018 |
| JP | 2018-81914 A | 5/2018 |
| JP | 2018-97954 A | 6/2018 |
| JP | 2019-71210 A | 5/2019 |
| JP | 2019-160625 A | 9/2019 |

(Continued)

OTHER PUBLICATIONS

International Search Report issued Sep. 28, 2021 in PCT/JP2021/025673 filed Jul. 7, 2021, 3 pages.
International Search Report issued Sep. 28, 2021 in PCT/JP2021/025677 filed Jul. 7, 2021, 3 pages.
International Search Report issued Oct. 12, 2021 in PCT/JP2021/028382 filed Jul. 30, 2021, 2 pages.
Zhang et al., "Enhancing Ionic Conductivity of Solid Electrolyte by Lithium Substitution in Halogenated Li-Argyrodite", Journal of Power Sources, vol. 450, 227601, 2019, 7 pages.
Kraft et al., "Influence of Lattice Polarizability on the Ionic Conductivity in the Lithium Superionic Argyrodites $Li_6PS_5X$ (X=Cl, Br, I)," Journal of the American Chemical Society, Figure 1, 139, 2017, 10 pages.

(Continued)

*Primary Examiner* — Colin W. Slifka
(74) *Attorney, Agent, or Firm* — Oblon, McClelland, Maier & Neustadt, L.L.P.

(57) ABSTRACT

A sulfide solid electrolyte to be used in a lithium-ion secondary battery, including an argyrodite crystal, in which the crystal is represented by a composition formula $Li_a$-M-$Z_b$-Ha$_c$; M is at least one element selected from Na, K, and elements each of which exists as any of divalent to pentavalent cations in the crystal; Z is at least one element selected from elements that exists as a divalent anion in the crystal; Z includes S; Ha is at least one element selected from the group consisting of F, Cl, Br, and I; a, b, and c in the composition formula indicate a ratio among contents (unit: at %) of the respective elements and satisfy $5 < a < 7$, $4 < b < 6$, and $0 < c < 2$; and a maximum distance between Li ions in the crystal is 2.54 Å or shorter.

8 Claims, No Drawings

(56)  References Cited

FOREIGN PATENT DOCUMENTS

| | | | |
|---|---|---|---|
| JP | 2019-169459 A | 10/2019 | |
| JP | 2020-27715 A | 2/2020 | |
| JP | 2020-119783 A | 8/2020 | |
| KR | 10-1952196 B1 | 2/2019 | |
| KR | 10-2020-000849 A | 1/2020 | |
| WO | WO 2015/012042 A1 | 1/2015 | |
| WO | WO 2018/218057 A2 | 11/2018 | |
| WO | WO 2020/050269 A1 | 3/2020 | |
| WO | WO 2020/095937 A1 | 5/2020 | |

OTHER PUBLICATIONS

International Search Report and Written Opinion issued Dec. 28, 2021 in PCT/JP2021/037974, 5 pages.

Extended European Search Report issued Jul. 24, 2024, in corresponding European Patent Application No. 21837335.5, 9 pages.
Extended European Search Report issued Aug. 5, 2024, in corresponding European Patent Application No. 21836933.8, 10 pages.
Extended European Search Report issued Sep. 18, 2024, in corresponding European Patent Application No. 21849673.5, 8 pages.
Extended European Search Report issued Sep. 25, 2024, in corresponding European Patent Application No. 21880172.8, 9 pages.
Chuang Yu et al., "Facile Synthesis toward the Optimal Structure-Conductivity Characteristics of the Argyrodite $Li_6PS_5Cl$ Solid-State Electrolyte", ACS Applied Materials & Interfaces, vol. 10, No. 39, 2018, pp. 33296-33306.
Ting Chen et al., "Argyrodite Solid Electrolyte with a Stable Interface and Superior Dendrite Suppression Capability Realized by ZnO Co-Doping", Applied Materials & Interfaces, vol. 11, No. 43, Oct. 30, 2019, pp. 40808-40816, URL:https://pubs.acs.org/doi/pdf/10.1021/acsami.9b13313>.

SULFIDE-BASED SOLID ELECTROLYTE USED FOR LITHIUM ION SECONDARY BATTERY AND PRODUCTION METHOD FOR SAME, SOLID ELECTROLYTE LAYER, AND LITHIUM ION SECONDARY BATTERY

CROSS-REFERENCE TO RELATED APPLICATIONS

This is a bypass continuation of International Patent Application No. PCT/JP2021/025673, filed on Jul. 7, 2021, which claims priorities to Japanese Patent Application No. 2020-117194, filed on Jul. 7, 2020; Japanese Patent Application No. 2020-130799, filed on Jul. 31, 2020; Japanese Patent Application No. 2020-172693, filed on Oct. 13, 2020; and Japanese Patent Application No. 2021-086406, filed on May 21, 2021. The contents of these applications are hereby incorporated by reference in their entireties.

TECHNICAL FIELD

The present invention relates to a sulfide solid electrolyte to be used in a lithium-ion secondary battery and a manufacturing method thereof, a solid electrolyte layer, and a lithium-ion secondary battery.

BACKGROUND ART

Lithium-ion batteries are used broadly in portable electronic devices such as cellphones and laptops.

Although liquid electrolytes have been used conventionally in lithium-ion secondary batteries, there is concern about liquid leakage, bursting into flames, etc. and it is necessary to use a large case for safety designing. Furthermore, improvements are desired about a short battery life and a narrow operation temperature range.

In this situation, all-solid-state lithium-ion secondary batteries that employ a solid electrolyte as an electrolyte of a lithium ion secondary battery are attracting attention because they are expected to, for example, increase safety and enable high-speed charging/discharging, improvement of cycle characteristics, and miniaturization of a case.

Solid electrolytes are generally classified into sulfide solid electrolytes and oxide solid electrolytes, and sulfide ions are higher in polarizability and exhibit higher ion conductivity than oxide ions. Examples of sulfide solid electrolytes include LGPS crystals such as $Li_{10}GeP_2S_{12}$, argyrodite crystals such as $Li_6PS_5Cl$, and LPS crystallized glass such as $Li_7P_3S_{11}$ crystallized glass.

Examples of a document that discloses an argyrodite sulfide solid electrolyte includes Patent literature 1. The sulfide solid electrolyte disclosed in Patent literature 1 has a cubic crystal structure belonging to a space group F-43m, includes a compound represented by a composition formula $Li_{7-x}PS_{6-x}Ha_x$ (Ha is Cl or Br, x=0.2 to 1.8), and is 60.0 or larger in the lightness L value of the L*a*b*color system. This is intended to increase the charging/discharging efficiency and improve the cycle characteristics by increasing the lithium ion conductivity and lowering the electron conductivity.

CITATION LIST

Patent Literature

Patent literature 1: WO 2015/012042

SUMMARY OF INVENTION

Technical Problem

To be used in lithium ion secondary batteries, sulfide solid electrolytes are desired to be made higher in lithium ion conductivity. In the argyrodite crystal as disclosed in Patent literature 1, it is known that the lithium ion conductivity increases as the content (proportion) of Ha (halogen element) becomes relatively higher. However, Ha, in particular, chlorine, has a risk of corroding aluminum or the like that is used as a current collector foil of a solid-state battery. As a result, there is a certain limit in increasing the lithium ion conductivity by increasing the content of Ha in an argyrodite crystal.

An object of the present invention is to provide a sulfide solid electrolyte that is even higher in lithium ion conductivity and its manufacturing method, a solid electrolyte layer, and a lithium-ion secondary battery.

Solution to Problem

The present inventors have studied diligently and completed the present invention by paying attention to the arrangement of lithium ions in an argyrodite crystal and finding out that the lithium ion conductivity can be made even higher by setting the maximum distance between Li ions in a particular range.

That is, the present invention includes the following modes of implementation:

1. A sulfide solid electrolyte to be used in a lithium-ion secondary battery, including an argyrodite crystal,
   in which the crystal is represented by a composition formula $Li_a$-M-$Z_b$-$Ha_c$;
   M is at least one element selected from Na, K, and elements each of which exists as any of divalent to pentavalent cations in the crystal;
   Z is at least one element selected from elements that exists as a divalent anion in the crystal;
   Z includes S;
   Ha is at least one element selected from the group consisting of F, Cl, Br, and I;
   a, b, and c in the composition formula indicate a ratio among contents (unit: at %) of the respective elements and satisfy 5<a<7, 4<b<6, and 0<c<2; and
   a maximum distance between Li ions in the crystal is 2.54 Å or shorter.

2. The sulfide solid electrolyte according to item 1, in which Z further includes O.

3. The sulfide solid electrolyte according to item 2,
   in which the crystal includes $M''^+$;
   $M''^+$ is any of monovalent to trivalent cations;
   M of $M''^+$ is at least one element M1 selected from Al, Ca, Mg, Na, and K; and
   $M''^+$ exists at a site of Li.

4. The sulfide solid electrolyte according to item 3, in which in the crystal the distance between $M''^+$ and O is 2.3 Å or shorter.

5. The sulfide solid electrolyte according to any one of items 2 to 4,
   in which M includes P mainly;
   M further includes an element M2 that is at least one of Si and B; and
   the element M2 exists at a site of P.

6. The sulfide solid electrolyte according to any one of items 2 to 5, the crystal includes an oxide anion having a Q0 structure having an M-O bond that is a bond of M and O, and M constituting the M-O bond includes at least one element M3 selected from Si, Al, Zr, and B.

7. A manufacturing method of a sulfide solid electrolyte to be used in a lithium-ion secondary battery, including:

mixing raw materials containing Li, M, Z, and Ha, followed by heat treatment, and obtaining an argyrodite crystal in a cooling process; and causing a temperature to stay in a range of 500° C. to 400° C. for 1 minute or longer in the cooling process, in which M is at least one element selected from Na, K, and elements each of which exists as any of divalent to pentavalent cations in the crystal;

Z is at least one element selected from elements that exists as a divalent anion in the crystal; and Ha is at least one element selected from the group consisting of F, Cl, Br, and I.

8. A manufacturing method of a sulfide solid electrolyte to be used in a lithium-ion secondary battery, including:

mixing raw materials containing Li, M, Z, and Ha, followed by heat treatment, and obtaining an argyrodite crystal in a cooling process; and reheating the obtained argyrodite crystal and causing a temperature to stay in a range of 500° C. to 400° C. for 1 minute or longer, in which M is at least one element selected from Na, K, and elements each of which exists as any of divalent to pentavalent cations in the crystal;

Z is at least one element selected from elements that exists as a divalent anion in the crystal; and Ha is at least one element selected from the group consisting of F, Cl, Br, and I.

9. A manufacturing method of a sulfide solid electrolyte to be used in a lithium-ion secondary battery, including:

mixing raw materials containing Li, M, Z, and Ha, followed by heat treatment, and obtaining an argyrodite crystal in a cooling process, in which in the cooling process, a cooling rate from 500° C. to 400° C. is 500° C./s or higher;

M is at least one element selected from Na, K, and elements each of which exists as any of divalent to pentavalent cations in the crystal;

Z is at least one element selected from elements that exists as a divalent anion in the crystal; and Ha is at least one element selected from the group consisting of F, Cl, Br, and I.

10. The manufacturing method of a sulfide solid electrolyte according to any one of items 7 to 9, in which the heat treatment is performed in an atmosphere containing a sulfur element.

11. The manufacturing method of a sulfide solid electrolyte according to any one of items 7 to 10, in which a temperature of the heat treatment is 500° C. or higher.

12. A solid electrolyte layer including the sulfide solid electrolyte according to any one of items 1 to 6.

13. A lithium-ion secondary battery including the sulfide solid electrolyte according to any one of items 1 to 6.

Advantageous Effects of Invention

The present invention can provide a sulfide solid electrolyte that is even higher in lithium ion conductivity because the maximum distance between Li ions in an argyrodite crystal is adjusted so as to fall within a particular range, its manufacturing method, a solid electrolyte layer, and a lithium-ion secondary battery.

DESCRIPTION OF EMBODIMENT

Although the present invention will be hereinafter described in detail, the present invention is not limited to the following embodiment and can be practiced being modified in a desired manner within such a range as not to depart from the spirit and scope of the present invention. Furthermore, the symbol "-" or the word "to" indicating a numerical value range is used in such a sense as to include numerical values written before and after the symbol or the word as a lower limit value and an upper limit value of the range, respectively.

<Sulfide Solid Electrolyte>

A sulfide solid electrolyte according to the embodiment (hereinafter also referred to simply as "present solid electrolyte") is a sulfide solid electrolyte to be used in a lithium-ion secondary battery and includes an argyrodite crystal.

In the present solid electrolyte, the crystal is represented by a composition formula $Li_a$-M-$Z_b$-$Ha_c$, M is at least one element selected from Na, K, and elements each of which exists as any of divalent to pentavalent cations in the crystal, Z is at least one element selected from elements that exists as a divalent anion in the crystal, and Ha is at least one element selected from the group consisting of F, Cl, Br, and I.

In the composition formula, a, b, and c indicate a ratio among the contents (unit: at %) of the respective elements and satisfy $5 < a < 7$, $4 < b < 6$, and $0 < c < 2$.

In the present solid electrolyte, the maximum distance between Li ions in the crystal is 2.54 Å or shorter.

In this specification, the term "maximum distance between Li ions" means a maximum distance between Li ions among distances between adjacent Li ions in an argyrodite crystal.

A specific method for measuring the maximum distance between Li ions is as follows. That is, a synchrotron X-ray diffraction measurement is performed on a sulfide solid electrolyte and a structure refinement analysis is performed by the Rietveld method. The maximum distance among distances between Li ions of the following items (1) to (4) (J. Am. Chem. Soc. 2017, 139, pp. 10,909-10,918, FIG. 1) that are obtained by the structure refinement analysis and considered as lithium ion movement routes in the argyrodite crystal can be judged to be the maximum distance between Li ions:

(1) Doublet (48 h-48 h) jump;

(2) 48 h-24 g jump;

(3) Intra-cage jump (intra-cage distance); and (4) Inter-cage jump (inter-cage distance).

Setting the maximum distance between Li ions 2.54 Å or shorter increases the lithium ion conductivity of the present solid electrolyte. The present inventors have found that the maximum distance between Li ions can be made shorter than before by adjusting argyrodite crystal manufacturing conditions etc. properly. It is considered that in the present solid electrolyte, since the maximum distance between Li ions is relatively short, Li ions are allowed to move through the crystal structure more easily and hence the lithium ion conductivity is increased.

The maximum distance between Li ions should be 2.54 Å or shorter, preferably 2.5 Å or shorter, even preferably 2.4 Å or shorter, and further preferably 2.3 Å or shorter. Although the degree of preference increases as the maximum distance between Li ions becomes shorter, it should practically be 1.8 Å or longer from the viewpoints of maintenance of the crystal structure and the ion radii of various elements constituting the crystal.

(Argyrodite Crystal)

The present solid electrolyte includes an argyrodite crystal represented by a composition formula $Li_a$-M-$Z_b$-$Ha_c$.

The argyrodite crystal may include either only one kind of argyrodite crystals having the same composition or two or more kinds of argyrodite crystals having different compositions.

From the viewpoint of the precision of measurement, it is preferable to analyze a crystal structure from a synchrotron X-ray powder diffraction (XRD) pattern. The crystal structure may be analyzed from an X-ray powder diffraction (XRD) pattern of a general-purpose instrument. A crystal can be judged to be of an argyrodite-type if an XRD pattern that is obtained in a case that a Cu-Kα ray is used as radiation source has peaks at $2\theta=15.7°\pm0.5°$ and $30.2°\pm0.5°$. It is preferable that the XRD pattern have a peak at $2\theta=18.0°\pm0.5°$ in addition to the above positions, and even preferable that the XRD pattern have, additionally, a peak at $2\theta=25.7°\pm0.5°$.

Locations of the individual elements in the crystal structure can be determined by performing crystal structure refinement for an XRD pattern measured using a synchrotron X-ray by the Rietveld method.

Contents of the individual elements and their sum can be determined by a composition analysis using ICP atomic emission spectrometry, atomic absorption spectrometry, ion chromatography, etc., and a crystal composition can be determined with higher precision by performing crystal structure refinement by the Rietveld method.

M is at least one element selected from Na, K, and elements each of which exists as any of divalent to pentavalent cations in the argyrodite crystal. Specific examples of elements each of which exists as any of divalent to pentavalent cations in the argyrodite crystal include B, Mg, Al, Si, P, Ca, Ti, V, Fe, Zn, Ga, Sr, Y, Zr, Nb, Mo, Sn, Sb, Ba, Ta, W, and Bi.

From the viewpoint of the oxidation-reduction potential of an element concerned, it is preferable that M include P mainly. The expression "M includes P mainly" means specifically that the ratio of the content (at %) of P to the content (at %) of M in the argyrodite crystal is 0.6 or larger, and this ratio is preferably 0.7 or larger and even preferably 0.8 or larger. There are no particular limitations on the upper limit of the ratio of the content (at %) of P to the content (at %) of M, the ratio may be 1 and is preferably 0.97 or lower and even preferably 0.95 or lower.

M may include at least one element selected from Na, K, Mg, and Ca. There is a case that a mixture containing lithium sulfide ($Li_2S$) is used suitably as a raw material of the argyrodite crystal. In this connection, whereas it is well known that lithium sulfide is manufactured from lithium hydroxide (LiOH), lithium hydroxide can contain, as impurities, at least one element (hereinafter also referred to as "R") selected from the group consisting of Na, K, Mg, and Ca. That is, there may occur a case that M includes R that originates from the impurities in such raw materials. To reduce the content of R that originates from the impurities, it may be necessary to use high-purity raw materials, possibly resulting in increase in manufacturing cost. In this case, from the viewpoint of suppression of the manufacturing cost, it is preferable that the ratio of the content (at %) of R to the content (at %) of M be 0.001 or larger, even preferably 0.01 or larger and further preferably 0.02 or larger. From the viewpoint of suppressing reduction of the lithium ion conductivity, it is preferable that the ratio of the content (at %) of R to the content (at %) of M be 0.4 or smaller, even preferably 0.3 or smaller. However, the above statement is not intended at all to eliminate having the argyrodite crystal contain R intentionally and doing so at a higher proportion than mentioned above. For example, R can also be contained in the argyrodite crystal as an element M1 (described later).

Z is at least one element selected from elements that exists as a divalent anion in the argyrodite crystal. Examples of such elements include S, O, Se, and Te.

Z includes S. From the viewpoint of lithium ion conductivity, it is preferable that Z include S mainly. The expression "Z includes P mainly" means specifically that the ratio of the content (at %) of S to the content (at %) of Z in the argyrodite crystal is 0.6 or larger, and this ratio is preferably 0.7 or larger and even preferably 0.8 or larger. There are no particular limitations on the upper limit of the ratio of the content (at %) of S to the content (at %) of Z, the ratio may be 1 and is preferably 0.95 or lower and even preferably 0.9 or lower.

The halogen element represented by Ha is at least one element selected from F, Cl, Br, and I. It is preferable that Ha include at least one of Cl and Br because in that case a crystal tends to become the argyrodite-type. Including Cl is even preferable, and being a Cl simple substance or a mixture of Cl and Br is even preferable. From the viewpoint of increasing the lithium ion conductivity further, it is preferable that Ha be a mixture of Cl and Br.

In this connection, in the case where Ha includes Cl and Br, with the contents of Cl and Br in the argyrodite crystal represented by x (at %) and y (at %), respectively, it is preferable that x/y be 0.1 or larger, even preferably 0.3 or larger and further preferably 0.5 or larger. On the other hand, it is preferable that x/y be 10 or smaller, even preferably 3 or smaller and further preferably 1.6 or smaller. In the case where x/y is in the above range, the interaction between lithium ions and halide ions becomes weaker and the lithium ion conductivity of the solid electrolyte tends to be high after heat treatment. This is considered to be an influence of a mixed anion effect that the interaction between cations and anions is weakened by mixing of bromide ions that are larger in ion diameter than chloride ions. Furthermore, in the case where x/y is in the above range, the cycle characteristics of a lithium ion secondary battery are improved easily.

In the case where Ha includes Cl and Br, with the ratio among the contents (at %) of the elements constituting the argyrodite crystal represented by $Li_a$-M-$Z_b$—$Cl_{c1}$—$Br_{c2}$, it is preferable that c1 be 0.1 or larger, even preferably 0.3 or larger and further preferably 0.5 or larger. It is preferable that c1 be 1.5 or smaller, even preferably 1.4 or smaller and further preferably 1.3 or smaller. It is preferable that c2 be 0.1 or larger, even preferably 0.3 or larger and further preferably 0.5 or larger. It is preferable that c2 be 1.9 or smaller, even preferably 1.6 or smaller and further preferably 1.4 or smaller. In the case where c1 and c2 are in the above respective ranges, a stable argyrodite crystal can be obtained while the proportion of halide ions in the crystal is made optimum and the interaction between anions and lithium ions in the crystal is weakened. As a result, the lithium ion conductivity of the solid electrolyte after being subjected to heat treatment tends to be high. Furthermore, in the case where c1 and c2 are in the above respective ranges, the cycle characteristics of a lithium ion secondary battery t are improved easily.

It is preferable that a, b, and (c1+c2) satisfy relationships that are similar to relationships of a, b, and c (described below).

Parameters of a, b, and c in the composition formula $Li_a$-M-$Z_b$-$Ha_c$ represent a ratio among the contents (unit: at %) of the respective elements. The parameters of a, b, and c satisfy $5<a<7$, $4<b<6$, and $0<c<2$. In the case where the parameters of a, b, and c satisfy these relationships, the crystal tends to become an argyrodite-type. It is even preferable that the parameter of a satisfy a relationship $5.1<a<6.3$, further preferably a relationship $5.2<a<6.2$. It is even preferable that the parameter of b satisfy a relationship $4<b<5.3$, further preferably a relationship $4.1<b<5.2$. It is even preferable that the parameter of c satisfy a relationship $0.7<c<1.9$, even preferably a relationship $0.8<c<1.8$.

Whereas a preferable crystal structure of the argyrodite crystal is cubic (e.g., F-43m), crystal structures that are lower in symmetry such as hexagonal, tetragonal, orthorhombic, or monoclinic ones, or a crystal structure that is even lower in symmetry such as a triclinic one may exist.

From the viewpoint of making the maximum distance between Li ions 2.54 Å or shorter, it is preferable that the argyrodite crystal be in forms described below.

It is preferable that Z include O. The expression "Z includes O" means that the argyrodite crystal contains $O^{2-}$. It is considered that in the case where the argyrodite crystal contains $O^{2-}$, the lattice constants tend to become smaller and the maximum distance between Li ions tend to be made 2.54 Å or shorter. In this case, there are no particular limitations on the site where $O^{2-}$ exists in the argyrodite crystal. Examples of a method for causing $O^{2-}$ to exist in the argyrodite crystal include adding an oxide such as $SiO_2$, $Al_2O_3$, $B_2O_3$, $P_2O_5$, $Li_2O$, and $Li_4SiO_4$ to raw materials. $O^{2-}$ tends to exist at the 16e site in the case where $SiO_2$ is added, and $O^{2-}$ tends to exist at the 4a site in the case where $Al_2O_3$ is added. Furthermore, $O^{2-}$ tends to exist at the 4a site in the case where $Li_2O$ is added.

In the case where Z includes O, it is preferable that the ratio of the O content (at %) to the Z content (at %) in the argyrodite crystal be 0.03 or larger, even preferably 0.05 or larger and further preferably 0.1 or larger. It is preferable that the ratio of the O content to the Z content (at %) be 0.4 or lower, even preferably 0.2 or lower from the view point of ion conductivity.

In the case where Z includes O, it is preferable that M contain at least one element (M1) selected from Al, Ca, Mg, Na, and K and the element M1 exist at the site of Li in the form of $M''^+$, where $M''^+$ represents a monovalent, divalent, or trivalent cation. In other words, it is preferable that the argyrodite crystal contain $M''^+$, M of $M''^+$ is an element M1, and $M''^+$ exists at site of Li. It is even preferable that the element M1 include Al.

In the case where Z includes O, it is even preferable that the argyrodite crystal further contain $M''^+$ from the viewpoint that the lattice constants tend to become smaller and hence the maximum distance between Li ions tend to be 2.54 Å or shorter. There are no particular limitations on the method for causing the argyrodite crystal to contain $M''^+$. Examples of the method include adding a compound containing an element M1 to raw materials, add an element M1 simple substance, or a mixture containing the element M1 simple substance to raw materials. Preferable examples of compounds containing the element M1 include oxides, sulfides, and halides of the element M1.

In the case where the argyrodite crystal contains $M''^+$, it is preferable that the ratio of the total content (at %) of $M''^+$ to the content (at %) of M in the argyrodite crystal be 0.001 or larger, even preferably 0.01 or larger and further preferably 0.1 or larger. From the viewpoint of maintaining the crystal structure, it is preferable that the ratio of the total content (at %) of $M''^+$ to the content (at %) of M be 0.4 or smaller, even preferably 0.3 or smaller. In the case where the argyrodite crystal contains $M''^+$, $M''^+$ and O may exist, for example, in such a state as to be adjacent to each other. In this case, it is preferable that the distance between $M''^+$ and O be 2.3 Å or shorter. It is even preferable that the distance between $M''^+$ and O be 2.2 Å or shorter, further preferably 2.1 Å or shorter. The distance between $M''^+$ and O can be determined in the same manner as a distance between M and O is (described later).

In the case where Z includes O, and M includes P mainly, it is also preferable that M further include an element M2 that is at least one of Si and B, and the element M2 exist at the site of P. It is even preferable that the element M2 include Si.

In the case where M satisfies the above requirements, the element M2 tends to be incorporated in the crystal structure in the form of M2-O which is a bond of the element M2 and oxygen. This is even preferable from the viewpoint that the lattice constants tend to become smaller and hence the maximum distance between Li ions tend to be 2.54 Å or shorter. There are no particular limitations on the method for causing the argyrodite crystal to contain M2 and having it exist at the site of P. Examples of the method include adding a compound containing an element M2 to raw materials, add an element M2 simple substance, or a mixture containing this simple substance to raw materials while performing oxygen blowing. Preferable examples of compounds containing the element M2 include oxides, sulfides, and nitrides, and carbides of the element M2.

In the case where M contains the element M2 existing at the site of P, it is preferable that the ratio of the total content (at %) of the element M2 existing at the site of P to the content (at %) of M in the argyrodite crystal be 0.01 or larger, even preferably 0.03 or larger and further preferably 0.05 or larger. From the viewpoint of maintaining the crystal structure, it is preferable that the ratio of the total content (at %) of the element M2 existing at the site of P to the content (at %) of M be 0.3 or smaller, even preferably 0.2 or smaller.

An argyrodite crystal having at least one of the above-described forms of implementation is preferable because the maximum distance between Li ions can be made relatively short. However, these modes of implementation are not indispensable for making the maximum distance between Li ions 2.54 Å or shorter. For example, other than these modes of implementation, adjusting the manufacturing conditions suitably would also contribute to making the maximum distance between Li ions shorter. This point will be described later.

In the case where M, for example, includes the element M2 existing at the site of P, and Z includes O, the argyrodite crystal has portions where M and O are located adjacent to each other and has an M-O bond. Although there are no particular limitations on the kind of bond, the bond may be a covalent bond, for example. In the M-O bond, it is preferable that the distance between M and O be 2.04 Å or shorter. It is even preferable that the distance between M and O be 2.03 Å or shorter, further preferably 2.02 Å or shorter. This means that the argyrodite crystal includes, in the crystal structure, an oxide anion having a Q0 structure having an M-O bond that is a bond of M and O. Presence of the oxide anion having the Q0 structure in the crystal structure, that is, its presence at an anion site of the crystal, can be confirmed by an X-ray powder diffraction (XRD) measurement or a neutron beam scattering measurement.

The Q0 structure is a structure that all oxygen atoms connected to the central cation M are a non-bridging oxygen. For example, in the case where M is Si, this means that an oxide $SiO_2$ exists in the form of a silicate ion, that is, an oxide anion $SiO_4^{4-}$.

Presence of the M-O bond can be confirmed by a Raman spectroscopic measurement or a nuclear magnetic resonance (NMR) measurement. In the Raman spectroscopic measurement, presence of the M-O bond can be confirmed in the form of a Raman scattering spectrum in a range of 750 to 1,500 $cm^{-1}$. For example, an Si—O bond, an Al—O bond, a Zr—O bond, and a B—O bond have a peak in a range of 800 to 1,300 $cm^{-1}$, a range of 775 to 1,275 $cm^{-1}$, a range of 850 to 1,350 $cm^{-1}$, and a range of 925 to 1,425 $cm^{-1}$, respectively.

The NMR measurement is applicable to limited nuclides; for example, in $^{29}$Si-NMR, a peak of an Si—O bond is found in a range of −125 to −50 ppm (reference substance: tetramethyl silane). In $^{27}$Al-NMR, a peak of an Al—O bond is found in a range of 0 to 80 ppm (reference substance: aluminum chloride). In $^{11}$B-NMR, a peak of a B—O bond is found in a range of −10 to 20 ppm (reference substance: boron trifluoride-diethyl ether complex). Although $^{91}$Zr-NMR is applicable to a nuclide Zr, it is not a very common analysis technique at the current moment.

The distance between M and O can be calculated from a crystal structure that is obtained by crystal structure refinement by the Rietveld method. However, atom positions that are determined by the crystal structure refinement by the Rietveld method are average atom positions. That is, in the case where two or more kinds of atoms (e.g., two kinds of O and S) exist as bonding partner atoms of M (or atoms adjacent to M), a distance to be calculated is not a pure distance between M and O but an average distance corresponding to proportions of presence of the respective elements. In this specification, the term "distance between M and O)" means an average distance that is determined by crystal structure refinement by the Rietveld method.

In the case where an oxide anion having a Q0 structure exists in the argyrodite crystal, the heat resistance of the argyrodite crystal is made so high that the argyrodite crystal exists stably without being decomposed even by high-temperature heat treatment. This enables heat treatment to be performed in a state that necessary lithium ion conductivity of the electrolyte is maintained. Examples of a method for causing an oxide anion having a Q0 structure to exist in the crystal structure include adding at least one of an oxide having an M-O bond and a composition containing an oxide anion having a Q0 structure having an M-O bond to raw materials for obtaining an argyrodite crystal and to mix them together.

It is preferable that the oxide anion having a Q0 structure have a wide potential window. This is because it is preferable that the oxide anion be not prone to be oxidized or reduced during charging or discharging of a lithium ion secondary battery taking into consideration that it is used in a solid electrolyte of a lithium ion secondary battery. In the oxide anion having a Q0 structure, it is preferable that M forming the M-O bond include at least one element M3 selected from Si, Al, Zr, and B from the viewpoint that the element is superior in oxidation/reduction resistance of an oxide of M.

In the argyrodite crystal in which Z includes O, M and O need not be bonded to each other. For example, M and O may exist in such a state as to be adjacent to each other. In this case, it is preferable that the distance between M and O be 2.3 Å or shorter, even preferably 2.2 Å or shorter and further preferably 2.1 Å or shorter.

From the viewpoint of obtaining high lithium ion conductivity when a battery is formed by grinding or pulverizing a solid electrolyte, it is preferable that the crystallite size of the argyrodite crystal be small. More specifically, it is preferable that the crystallite size be 1,000 nm or smaller, even preferably 500 nm or smaller and further preferably 250 nm or smaller. Although there are no particular limitations on the lower limit of the crystallite size, the crystallite size is usually 5 nm or larger.

The crystallite size can be calculated using a peak half width of an XRD pattern and the Scherrer equation.
(Sulfide Solid Electrolyte)

From the viewpoint of achieving high lithium ion conductivity, it is preferable that the proportion of the argyrodite crystal in a sulfide solid electrolyte be 50 mass % or larger, even preferably 65 mass % or larger and further preferably 80 mass % or larger. There are no particular limitations on its upper limit; although it may be 100 mass %, it is commonly 99 mass % or smaller. The proportion of the argyrodite crystal can be calculated by performing a measurement by XRD or neutron beam scattering by having it contain an internal reference substance and comparing peak intensity of it with that of the internal reference substance.

What may be included in the present solid electrolyte other than the argyrodite crystal include, for example, $Li_3PS_4$, $Li_4P_2S_6$, $Li_2S$, and LiHa (Ha is at least one kind of halogen element selected from F, Cl, Br, and I).

When the present solid electrolyte is used in a lithium-ion secondary battery, if necessary, a solid electrolyte layer is formed together with other components such as a binder. The binder and the other components are known ones.

It is preferable that the content of the present solid electrolyte with respect to the entire solid electrolyte layer be 80 mass % or higher, even preferably 90 mass % or higher.

A method of forming a solid electrolyte layer is also a known one. For example, a solid electrolyte layer can be formed by producing slurry by dispersing or dissolving components to constitute the solid electrolyte layer in a solvent, applying the slurry in a layer form (sheet form), drying it, and optionally pressing a dried layer. If necessary, debinding treatment may be performed by applying heat. The thickness of a solid electrolyte layer can be adjusted easily by adjusting, for example, the application amount of the slurry.

Instead of the wet shaping, the solid electrolyte layer may be formed by pressing solid electrolyte powder or the like on the surface of a positive electrode, a negative electrode, or the like in a dry state. Another forming method is possible in which a solid electrolyte layer is formed on another substrate and then transferred onto the surface of a positive electrode, a negative electrode, or the like.

The present solid electrolyte may be used as a positive electrode layer or a negative electrode layer by mixing it with a positive electrode active material or a negative electrode active material. The positive electrode active material used in a positive electrode layer or the negative electrode active material used in a negative electrode layer, a current collector, a binder, a conductive agent, etc. are known ones.

A lithium-ion secondary battery in which the present solid electrolyte is employed may be one including the present solid electrolyte, and includes, for example, the solid electrolyte layer, the positive electrode layer, and the negative electrode layer.

A material of an exterior body of the lithium-ion secondary battery can also be a known one. A shape of the lithium-ion secondary battery can also be a known one such as a coin shape, a sheet shape (film shape), a folded shape, a winding cylindrical shape having a bottom, and a button shape, one of which can be selected as appropriate according to a use.

<Manufacturing Method of Sulfide Solid Electrolyte>

There are no particular limitations on the manufacturing method of the present solid electrolyte except that a solid electrolyte that satisfies the above-described requirements can be obtained. For example, employment of one of the following manufacturing method (I) and manufacturing method (II) is preferable.

Manufacturing Method (I):

A manufacturing method of a sulfide solid electrolyte to be used in a lithium-ion secondary battery, including:

the steps of mixing raw materials containing Li, M, Z, and Ha, followed by heat treatment (heat treatment step), and obtaining an argyrodite crystal in a cooling process (cooling step), and at least one of the following steps (i) and (ii):

(i) causing the temperature to stay in a range of 500° C. to 400° C. for 1 minute or longer in the cooling process; and (ii) reheating the obtained argyrodite crystal and causing the temperature to stay in a range of 500° C. to 400° C. for 1 minute or longer (reheating step).

Manufacturing Method (II):

A manufacturing method of a sulfide solid electrolyte to be used in a lithium-ion secondary battery, including the steps of:

mixing raw materials containing Li, M, Z, and Ha, followed by heat treatment (heat treatment step), and obtaining an argyrodite crystal in a cooling process (cooling step), in which:

in the cooling process, a cooling rate from 500° C. to 400° C. is 500° C./s or higher.

In the manufacturing methods (I) and (II), Li, M, Z, and Ha are the same as Li, M, Z, and Ha in the composition formula $Li_a$-M-$Z_b$-$Ha_c$ of the present solid electrolyte. That is, M is at least one element selected from Na, K, and elements each of which exists as any of divalent to pentavalent cations in the argyrodite crystal, and Z is at least one element selected from elements that exists as a divalent anion in the argyrodite crystal. In the case where Mis an element that exists as any of divalent to pentavalent cations in the argyrodite crystal, this element may either likewise exist as any of divalent to pentavalent cations in the raw materials or not exist as one of divalent to pentavalent cations in the raw materials. Likewise, Z may either exist as a divalent anion in the raw materials or not exist as a divalent anion in the raw materials.

(Heat Treatment Step)

In the heat treatment step, the raw materials containing Li, M, Z, and Ha are mixed together and subjected to the heat treatment.

For example, an appropriate combination of a compound containing each of Li, M, Z, and Ha, and a simple substance of each of Li, M, Z can be used as the raw materials containing Li, M, Z, and Ha. For a specific example, in the case where M includes P mainly and Z includes S mainly, the raw materials are obtained by combining a compound containing Li, a compound containing P, a compound containing S, and a compound containing Ha, and adding other components if necessary.

Examples of the compound containing Li include lithium compounds such as lithium sulfide ($Li_2S$), lithium oxide ($Li_2O$), lithium carbonate ($Li_2CO_3$), lithium hydroxide (LiOH), and lithium sulfate ($LiSO_4$). The lithium metal simple substance can also be used.

Examples of the compound containing P include phosphorus compounds such as phosphorus sulfides such as diphosphorus trisulfide ($P_2S_3$) and diphosphorus pentasulfide ($P_2S_5$), lithium phosphates ($LiPO_3$, $Li_4P_2O_7$, $Li_3PO_4$), and sodium phosphates ($NaPO_3$, $Na_4P_2O_7$, $Na_3PO_4$). The phosphorus simple substance can also be used.

Examples of the compound containing S include lithium sulfide ($Li_2S$, mentioned above), phosphorus sulfides ($P_2S_3$ and $P_2S_5$, mentioned above), and hydrogen sulfide ($H_2S$). The sulfur simple substance can also be used.

Among compounds containing Ha, an example of a compound containing Cl (chlorine) includes lithium chloride (LiCl), phosphorus trichloride ($PCl_3$), phosphorus pentachloride ($PCl_5$), diphosphorus tetrachloride ($P_2Cl_4$), phosphoryl chloride ($POCl_3$), sulfur dichloride ($SCl_2$), disulfur dichrolide ($S_2Cl_2$), sodium chloride (NaCl), and boron trichloride ($BCl_3$).

Among the compounds containing Ha, an example of a compound containing Br (bromine) includes lithium bromide (LiBr), phosphorus tribromide ($PBr_3$), phosphoryl bromide ($POBr_3$), disulfur dibromide ($S_2Br_2$), sodium bromide (NaBr), and boron tribromide ($BBr_3$).

When some of the above compounds are combined, a combination of lithium sulfide, phosphorus sulfide, and at least one of lithium chloride and lithium bromide is preferable.

Examples of the other components to be added if necessary include, for example, compounds containing the above-exemplified M other than P and compounds containing Z other than the above-exemplified S. From the viewpoint that an argyrodite crystal having a relatively short maximum distance between Li ions can be obtained easily, preferable examples of the other components include compounds containing the above-mentioned element M1 and simple substances thereof and compounds containing the above-mentioned element M2 and simple substances thereof, even preferably an oxide of the element M1, an oxide of the element M2, a simple substance of the element M1, and a simple substance of the element M2 and further preferably $Al_2O_3$, $SiO_2$, and $B_2O_3$. In the case where the simple substance(s) of the element M1 or the simple substance(s) of the element M2 is used, it is preferable to oxidize the simple substance(s) in a heat treatment step (described later). An example of oxidizing method includes adding the simple substance(s) while performing oxygen blowing.

The above raw materials are very unstable in the air and may decompose when reacting with water to generate hydrogen sulfide gas or be oxidized. It is therefore preferable that they be mixed together in an inert atmosphere.

For example, the raw materials can be mixed together by mixing using media as in a case of a planetary ball mill or by medialess mixing such as air-flow mixing or cases using a pin mill or a powder stirrer. The raw materials may be made amorphous by mixing before heating.

After the raw materials are mixed together, heat treatment is performed. The heat treatment step includes at least the second heat treatment described below. If necessary, the heat treatment step further includes the first heat treatment described below.

The first heat treatment includes obtaining an intermediate or a substance including an intermediate by mixing together part or all of raw materials and performing treatment such as heating on a resulting mixture. In the case where the first treatment is performed on part of the raw materials, the second heat treatment may be performed after adding or mixing remaining raw materials to or with the thus-obtained intermediate or substance including an intermediate. Obtaining the intermediate or the substance including an intermediate in advance in the first heat treatment is preferable because the reactivity is increased in the second heat treatment. It is noted that the intermediate or the substance including an intermediate may be higher in atmospheric stability than raw materials that are low in atmospheric stability and in the ease of handling.

Specific examples of the intermediate include amorphous sulfide solid electrolyte materials, crystalline sulfide solid electrolyte materials, and argyrodite crystals as intermediates. The term "argyrodite crystal as an intermediate" means an argyrodite crystal that has an argyrodite crystal structure but is not the argyrodite crystal of the above-described present solid electrolyte. The argyrodite crystal as an intermediate may include a target argyrodite crystal as its part.

There are no particular limitations on the conditions of the first heat treatment, proper adjustments may be made according to the composition of a target intermediate and other factors. For example, it is preferable that the heat treatment temperature of the first heat treatment be 250° C. or higher and 650° C. or lower. And it is preferable that the heat treatment time be 0.1 hour or longer and 20 hours or shorter.

In the case where M includes P mainly and Z includes S mainly, the following step, as a specific example of the first heat treatment, is conceivable. That is, in the first heat treatment, raw materials containing Li, P, S, and Ha are mixed together and heated, whereby a substance including an argyrodite crystal as an intermediate is obtained. Subsequently, after mixing, as appropriate, raw materials containing desired elements of M other than P, desired elements of Z other than S, etc. and heating a resulting mixture, the second heat treatment is performed.

In the case where the first heat treatment is to obtain an argyrodite crystal as an intermediate (exemplified above), from the viewpoint of accelerating a solid phase reaction, that is, crystallization, it is preferable that the heat treatment temperature be 400° C. or higher, even preferably 450° C. or higher and further preferably 500° C. or higher. On the other hand, from the viewpoint of suppressing thermal decomposition, it is preferable that the heat treatment temperature be lower than 600° C., even preferably 575° C. or lower.

In the case where the first heat treatment is likewise to obtain an argyrodite crystal as an intermediate, it is preferable that the heat treatment time be 1 hour or longer, even preferably 2 hours or longer and further preferably 4 hours or longer. On the other hand, it is preferable that the heat treatment time be 100 hours or shorter, even preferably 50 hours or shorter and further preferably 24 hours or shorter. It is preferable that such heat treatment be performed, for example, in an inert gas atmosphere or an atmosphere containing the sulfur element such as a hydrogen sulfide gas atmosphere and a sulfur gas atmosphere, or under vacuum sealing.

If necessary, the first heat treatment may be performed plural times. A step of obtaining an intermediate by causing a mixture of raw materials to react with each other in a mechanochemical manner using a mixer may be performed in place of the first heat treatment. As a further alternative, both of this step and the first heat treatment may be performed.

In the case where the first heat treatment is performed, the second heat treatment is performed after the first heat treatment. Alternatively, in the case where the first heat treatment is not performed, raw materials are mixed together and then the second heat treatment is performed on a resulting mixture. The second heat treatment requires that an argyrodite crystal be obtained in a cooling process that is performed after the second heat treatment. The second heat treatment is indispensable in a manufacturing method of the present solid electrolyte.

As for the conditions of the second heat treatment, although they depend on the composition, from the viewpoints of uniformizing the structure of an electrolyte to be obtained and obtaining an argyrodite crystal in the cooling process, it is preferable that the heat treatment temperature be 500° C. or higher, even preferably 600° C. or higher, further preferably 650° C. or higher, and particularly preferably 700° C. or higher. On the other hand, from the viewpoint of preventing thermal decomposition due to an unnecessary high temperature, it is preferable that the heat treatment temperature be 900° C. or lower, even preferably 800° C. or lower. As for the atmosphere of the second heat treatment, it is preferable that, for example, the second heat treatment be performed in an inert gas atmosphere or an atmosphere containing the sulfur element such as a hydrogen sulfide gas atmosphere and a sulfur gas atmosphere or under vacuum sealing.

For the same reason, it is preferable that the heat treatment time of the second heat treatment be 0.1 hour or longer, even preferably 0.25 hour or longer and further preferably 0.5 hour or longer. On the other hand, it is preferable that the heat treatment time be 4 hours or shorter, even preferably 2 hours or shorter and further preferably 1 hour or shorter.

(Cooling Step)

In the cooling step which is performed after the above-described second heat treatment, an argyrodite crystal is obtained by a cooling process that is performed on the mixture that has been obtained by the second heat treatment. The expression "an argyrodite crystal is obtained by a cooling process" means unlike in, for example, a case that an argyrodite crystal is obtained by a solid-phase reaction or the like during heat treatment (i.e., by the heat treatment itself), the mixture does not have an argyrodite crystal during or immediately after the heat treatment, but an argyrodite crystal is formed in a temperature decreasing process of cooling. Typically, an argyrodite crystal is obtained in the cooling process in the case where an argyrodite crystal is obtained by melting the mixture of the raw materials in the second heat treatment and cooling a resulting melt. That is, typically, it is preferable that the above-described conditions of the second heat treatment be such as to be able to melt the mixture of the raw materials.

In the manufacturing method according to the embodiment, in addition to the fact that an argyrodite crystal is obtained in the cooling process, the maximum distance between Li ions can be made relatively short by adjusting the conditions of that cooling process so that they fall into particular ranges.

That is, in the manufacturing method (I), the maximum distance between Li ions can be made relatively short by satisfying at least one of the following requirements (i) and (ii) while obtaining an argyrodite crystal in the process of cooling the mixture after the second heat treatment:

(i) causing the temperature to stay in a range of 500° C. to 400° C. for 1 minute or longer in the cooling process; and (ii) reheating the obtained argyrodite crystal and causing the temperature to stay in a range of 500° C. to 400° C. for 1 minute or longer (reheating step).

As for the reason, it is considered that lithium ions are located at thermodynamically stable positions in the above step (i) or (ii) by causing the temperature to stay in the range of 500° C. to 400° C. for the prescribed time or longer.

In step (i), it is preferable that the temperature be caused to stay in the range of 500° C. to 400° C. for 1 minute or longer, even preferably 2 minutes or longer and further preferably 5 minutes or longer. From the viewpoint of productivity, as for the upper limit of the staying time, it is preferable that the staying time be 120 minutes or shorter, even preferably 100 minutes or shorter.

In step (ii), it is preferable that the temperature be caused to stay in the range of 500° C. to 400° C. for 1 minute or longer, even preferably 2 minutes or longer and further preferably 5 minutes or longer. From the viewpoint of productivity, as for the upper limit of the staying time, it is preferable that the staying time be 120 minutes or shorter, even preferably 100 minutes or shorter.

In the manufacturing method (II), the maximum distance between Li ions can be made relatively short because the cooling rate from 500° C. to 400° C. is 500° C./s or higher while obtaining an argyrodite crystal in the cooling process.

As for the reason, it is considered that movement of lithium in the cooling process is restricted to a lowest degree because the cooling rate from 500° C. to 400° C. is the prescribed rate or higher. That is, it is considered that in general a structure in which lithium ions can move easily is formed at a high temperature such as 500° C. or higher and this structure can be reflected when the cooling is performed at a very high rate.

It is preferable that the cooling rate from 500° C. to 400° C. be 500° C./s or higher, even preferably 1,000° C./s or higher and further preferably 3,000° C./s or higher. Although there are no particular limitations on the upper limit of the cooling rate from 500° C. to 400° C., it is practical that the cooling rate be 106° C./s or lower.

EXAMPLES

Although the present invention will be described below in a specific manner using Inventive Examples, the present invention is not limited to them.

Example 1, Example 3, Example 5, Example 6, and Example 8 are Inventive Examples and Example 2, Example 4, and Example 7 are Comparative Examples.
[Evaluation]
(Lithium Ion Conductivity)

A measurement sample was produced by pressing a powder obtained into a green compact at a pressure of 380 kN and lithium ion conductivity was measured using an AC impedance measuring instrument (a potentiostat/galvanostat "VSP" produced by Bio-Logic Sciences Instruments).

As for measurement conditions, the measurement frequency range was 100 Hz to 1 MHz, the measurement voltage was 100 mV, and the measurement temperature was 25° C.
(Refinement of Crystal Structure by Synchrotron X-Ray Diffraction Measurement and Rietveld Method)

A synchrotron X-ray diffraction measurement was performed on a sulfide solid electrolyte of each Example and crystal structure refinement was performed by the Rietveld method using RIETAN-FP software, whereby lattice constants of an argyrodite crystal in a sulfide solid electrolyte and interionic distances of the following items (1) to (4) (J. Am. Chem. Soc. 2017, 139, pp. 10,909-10,918, FIG. 1) that were considered to be lithium ion movement routes in the argyrodite crystal structure were determined. The maximum distance among the interionic distances of the items (1) to (4) was employed as a maximum distance between Li ions:
    (1) Doublet (48 h-48 h) jump;
    (2) 48 h-24 g jump;
    (3) Intra-cage jump (intra-cage distance); and
    (4) Inter-cage jump (inter-cage distance).

A structure in which the Rwp value was smallest in a result of a Rietveld analysis was judged to be a crystal structure of each Example. The Rwp value is a reliability factor Rwp (R-weighted pattern) that is a common measure for the entire analysis range in structure refinement fitting by the Rietveld analysis. A smaller Rwp value is better; in each analysis performed, a smallest Rwp value was smaller than 10%. Incidentally, in certain crystal structures, part of the interionic distances of the items (1) to (4) shown in Table 1 cannot be defined. Interionic distances of such kinds as not to be defined in such crystal structures are made empty in Table 1.

Conditions of the synchrotron X-ray diffraction measurement were as follows:
    measurement method: powder X-ray analysis
    optical energy used for measurement: 17.71 keV
    sample shape: capillary having a diameter of 0.3 mm
    measurement angle range: $2\theta = 0.1°$ to 95°
    step width ($\Delta 2\theta$): 0.010°; and
    detector: Debye-Scherrer camera and two-dimensional semiconductor detector.
(M-O Distance)

A distance between M and O in the argyrodite crystal was checked by measuring an interatomic distance in a crystal structure obtained by the crystal structure refinement by the Rietveld method for the sulfide solid electrolyte of each Example.

Example 1

A lithium sulfide powder (produced by Sigma-Aldrich Co. LLC, purity: 99.98%), a diphosphorus pentasulfide powder (produced by Sigma-Aldrich Co. LLC, purity: 99%), and a lithium chloride powder (produced by Sigma-Aldrich Co. LLC, purity: 99.99%) were weighed in a dry nitrogen atmosphere so as to obtain the composition shown in Table 1, and mixed together at 400 rpm for 4 hours in the same atmosphere using a planetary ball mill. Then a resulting mixture was vacuum-sealed in a carbon-coated quartz pipe and heated at 550° C. for 5 hours, whereby an argyrodite crystal was obtained.

An $SiO_2$ powder (produced by Sigma-Aldrich Co. LLC, purity: higher than 99%) was added to the thus-obtained argyrodite crystal and they were mixed together in a mortar into a mixture. The addition amount of the $SiO_2$ powder was adjusted so that the proportions of Si and O satisfied the composition shown in Table 1.

The thus-obtained mixture was formed into a pellet, again vacuum-sealed in a carbon-coated quartz pipe, and heat-treated at 650° C. for 30 minutes, whereby a sulfide solid electrolyte including an argyrodite crystal was obtained in a cooling process. The cooling rate in the cooling process was set at 20° C./s and cooling was made to room temperature. Subsequently, reheating was performed at 500° C. for 1 hour, whereby a sulfide solid electrolyte including an argyrodite crystal having the composition shown in Table 1 was obtained.

Example 2

A lithium sulfide powder (produced by Sigma-Aldrich Co. LLC, purity: 99.98%), a diphosphorus pentasulfide powder (produced by Sigma-Aldrich Co. LLC, purity: 99%), and a lithium chloride powder (produced by Sigma-Aldrich Co. LLC, purity: 99.99%) were weighed in a dry nitrogen atmosphere so as to obtain the composition shown in Table 1, and mixed together at 400 rpm for 4 hours in the same atmosphere using a planetary ball mill. Then a resulting mixture was vacuum-sealed in a carbon-coated quartz pipe and heated at 550° C. for 5 hours, whereby a sulfide solid electrolyte including an argyrodite crystal having the composition shown in Table 1 was obtained.

Example 3

A sulfide solid electrolyte including an argyrodite crystal having the composition shown in Table 1 was obtained in the same manner as in Example 1 except that the mixing ratio of raw materials was adjusted so that the composition shown in Table 1 was obtained and reheating after cooling was performed at 450° C. for 1 hour.

Example 4

A sulfide solid electrolyte including an argyrodite crystal having the composition shown in Table 1 was obtained in the same manner as in Example 3 except that the cooling rate in a cooling process that was performed after heat treatment of 650° C. and 30 minutes was set at 5° C./s and reheating was not performed after the cooling process.

Example 5

A sulfide solid electrolyte including an argyrodite crystal having the composition shown in Table 1 was obtained in the same manner as in Example 3 except that the mixing ratio of raw materials was adjusted so that the composition shown in Table 1 was obtained.

It is noted that a lithium bromide powder (produced by Sigma-Aldrich Co. LLC, purity: 99.995%) was used as a Br source in the raw materials of Example 5.

Example 6

A lithium sulfide powder (produced by Sigma-Aldrich Co. LLC, purity: 99.98%), a diphosphorus pentasulfide powder (produced by Sigma-Aldrich Co. LLC, purity: 99%), a lithium chloride powder (produced by Sigma-Aldrich Co. LLC, purity: 99.99%), and a lithium bromide powder (produced by Sigma-Aldrich Co. LLC, purity: 99.995%) were weighed in a dry nitrogen atmosphere so as to obtain the composition shown in Table 1, and mixed together at 400 rpm for 4 hours in the same atmosphere using a planetary ball mill. Then a resulting mixture was vacuum-sealed in a carbon-coated quartz pipe and heated at 450° C. for 5 hours, whereby an argyrodite crystal was obtained.

An $SiO_2$ powder (produced by Sigma-Aldrich Co. LLC, purity: higher than 99%) was added to the thus-obtained argyrodite crystal and they were mixed together in a mortar into a mixture. The addition amount of the $SiO_2$ powder was adjusted so that the proportions of Si and O satisfied the composition shown in Table 1.

The thus-obtained mixture was formed into a pellet, vacuum-sealed in a quartz pipe, and heat-treated at 750° C.

for 30 minutes, whereby a sulfide solid electrolyte including an argyrodite crystal was obtained in a cooling process. The cooling rate in the cooling process was set at 10° C./s and cooling was made to room temperature. Subsequently, the sulfide solid electrolyte was put in a carbon container and reheating was performed at 450° C. for 1 hour in an $N_2$ atmosphere having a dew point of −60° C. or lower, whereby a sulfide solid electrolyte including an argyrodite crystal having the composition shown in Table 1 was obtained.

Example 7

A lithium sulfide powder (produced by Sigma-Aldrich Co. LLC, purity: 99.98%), a diphosphorus pentasulfide powder (produced by Sigma-Aldrich Co. LLC, purity: 99%), and a lithium chloride powder (produced by Sigma-Aldrich Co. LLC, purity: 99.99%) were weighed in a dry nitrogen atmosphere so as to obtain the composition shown in Table 1, and mixed together at 400 rpm for 10 hours in the same atmosphere using a planetary ball mill. Then a resulting mixture was vacuum-sealed in a carbon-coated quartz pipe and heated at 450° C. for 10 hours, whereby a sulfide solid electrolyte including an argyrodite crystal having the composition shown in Table 1 was obtained.

Example 8

A lithium sulfide powder (produced by Sigma-Aldrich Co. LLC, purity: 99.98%), a diphosphorus pentasulfide powder (produced by Sigma-Aldrich Co. LLC, purity: 99%), a lithium chloride powder (produced by Sigma-Aldrich Co. LLC, purity: 99.99%), a lithium bromide powder (produced by Sigma-Aldrich Co. LLC, purity: 99.995%), and an $Al_2O_3$ powder (type "CG-20" produced by Sigma-Aldrich Co. LLC) were weighed in a dry nitrogen atmosphere so as to obtain the composition shown in Table 1, and mixed together at 400 rpm for 4 hours in the same atmosphere using a planetary ball mill. Subsequently, a resulting mixture was vacuum-sealed in a carbon-coated quartz pipe and heated at 700° C. for 30 minutes and a sulfide solid electrolyte including an argyrodite crystal was obtained in a cooling process. The cooling rate in the cooling process was set at 20° C./s and cooling was made to room temperature. Subsequently, the sulfide solid electrolyte was transferred to a carbon container and reheated at 450° C. for 1 hour in a nitrogen atmosphere having a dew point of −60° C., whereby a sulfide solid electrolyte including an argyrodite crystal having the composition of Example 8 was obtained.

It is noted that the compositions of the argyrodite crystals of the Examples shown in Table 1 have convergence values that were obtained by a Rietveld analysis using, as initial values, atomic fractions that were obtained from results of ICP atomic emission spectrometry for the elements P and S, atomic absorption spectrometry for the element Li, and ion chromatography for the elements Cl and Br.

A measurement result of lithium ion conductivity, lattice constants of the argyrodite crystal, and interionic distances of the following items (1) to (4) that were considered to be distances of lithium ion movement routes in the crystal structure of the argyrodite crystal are shown in Table 1 for the sulfide solid electrolyte of each Example. The maximum distance among the interionic distances of the items (1) to (4) is written in bold and Italic characters. In Table 1, "Ha/M" represents the ratio of an Ha content (at %) to an M content (at %) of the argyrodite crystal:

(1) Doublet (48 h-48 h) jump;
(2) 48 h-24 g jump;
(3) Intra-cage jump (intra-cage distance); and
(4) Inter-cage jump (inter-cage distance).

As for the argyrodite crystal in the sulfide solid electrolyte of each Example, the argyrodite crystal of Examples 1, 3-6, and 8 contained O as Z. That is, the argyrodite crystal contained $O^{2-}$. In Examples 1 and 3-6 in which Si was contained, Si existed at the site of P. In Example 8 that contained Al, Al was a trivalent cation and existed at the site of Li. Example 1 had an Si—O bond and the distance between Si and O was 2.04 Å or shorter. In Example 8, the distance between Al and O was 2.30 Å or shorter. It is noted that as mentioned above the expressions "distance between Si and O" and "distance between Al and O" mean an average distance obtained by crystal structure refinement by the Rietveld method.

The invention claimed is:

1. A sulfide solid electrolyte to be used in a lithium-ion secondary battery, comprising an argyrodite crystal, wherein the crystal is represented by a composition formula $Li_a$-M-$Z_b$-$Ha_c$;

M is at least one element selected from Na, K, and elements each of which exists as any of divalent to pentavalent cations in the crystal;

Z is at least one element selected from elements that exists as a divalent anion in the crystal;

Z comprises S;

Ha is at least one element selected from the group consisting of F, Cl, Br, and I;

a, b, and c in the composition formula indicate a ratio among contents (unit: at %) of the respective elements and satisfy $5 < a < 7$, $4 < b < 6$, and $0 < c < 2$; and a maximum distance between Li ions in the crystal is 2.54 Å or shorter.

2. The sulfide solid electrolyte according to claim 1, wherein Z further comprises O.

TABLE 1

| Analyzed composition | Ha/M | Lithium ion conductivity (mS · cm$^{-1}$) | Lattice constant a (Å) | Doublet (48 h-48 h) jump (Å) | 48 h-24 g jump (Å) | Intra-cage jump (Å) | Inter-cage jump (Å) |
|---|---|---|---|---|---|---|---|
| Example 1 $Li_{5.92}P_{0.96}S_{4.91}Cl_{1.06}O_{0.08}$ | 1.06 | 2.2 | 9.85 | 2.26 | | 2.28 | *2.42* |
| Example 2 $Li_{5.94}PS_{4.94}Cl_{1.05}$ | 1.05 | 1.8 | 9.85 | 1.95 | | 2.47 | *2.55* |
| Example 3 $Li_{5.4}P_{0.95}Si_{0.05}S_{4.3}Cl_{1.6}O_{0.10}$ | 1.60 | 8.2 | 9.81 | *2.49* | | 2.26 | 2.18 |
| Example 4 $Li_{5.4}P_{0.95}Si_{0.05}S_{4.3}Cl_{1.6}O_{0.10}$ | 1.60 | 4.8 | 9.82 | *2.73* | | 2.45 | 1.76 |
| Example 5 $Li_{5.4}P_{0.95}Si_{0.05}S_{4.3}Cl_{1.0}Br_{0.06}O_{0.10}$ | 1.60 | 11.4 | 9.86 | *2.18* | 1.54 | | 1.71 |
| Example 6 $Li_{5.40}P_{0.938}Si_{0.05}S_{4.23}Cl_{0.77}$ $Br_{0.78}O_{0.10}$ | 1.57 | 10.0 | 9.90 | *2.25* | 1.46 | | 1.86 |
| Example 7 $Li_{5.25}PS_{4.75}Cl_{1.75}$ | 1.75 | 4.4 | 9.78 | 1.90 | | 2.16 | *2.77* |
| Example 8 $Li_{5.1}P_{0.98}Al_{0.31}S_{4.18}Cl_{0.70}Br_{0.69}O_{0.39}$ | 1.08 | 9.9 | 9.90 | 1.89 | 1.58 | | *1.99* |

As seen from Table 1, the results were such that the sulfide solid electrolyte of Examples 1, 3, 5, 6, and 8 which are Inventive Examples were high in lithium ion conductivity because of a short maximum distance between Li ions. Furthermore, comparison between Examples 1 and 2 shows that Example 1 that had a shorter maximum distance between Li ions was higher in lithium ion conductivity although they were equivalent in Ha/M. The same is true of Examples 3 and 4; Example 3 that had a shorter maximum distance between Li ions was higher in lithium ion conductivity.

Although the present invention has been described above in detail with reference to the particular embodiment, it is apparent to those skilled in the art that various changes and modifications are possible without departing from the spirit and scope of the present invention. The present application is based on Japanese Patent Application No. 2020-117194 filed on Jul. 7, 2020, No. 2020-130799 filed on Jul. 31, 2020, No. 2020-172693 filed on Oct. 13, 2020, and No. 2021-086406 filed on May 21, 2021, the disclosures of which are incorporated herein by reference.

3. The sulfide solid electrolyte according to claim 2, wherein the crystal comprises $M''^{+}$;

$M''^{+}$ is any of monovalent to trivalent cations;

M of $M''^{+}$ is at least one element M1 selected from Al, Ca, Mg, Na, and K; and $M''^{+}$ exists at a site of Li.

4. The sulfide solid electrolyte according to claim 3, wherein in the crystal, a distance between $M''^{+}$ and O is 2.3 Å or shorter.

5. The sulfide solid electrolyte according to claim 2, wherein M comprises P mainly;

M further comprises an element M2 that is at least one of Si and B; and the element M2 exists at a site of P.

6. The sulfide solid electrolyte according to claim 2, wherein the crystal comprises an oxide anion having a Q0 structure having an M-O bond that is a bond of M and O, and M constituting the M-O bond comprises at least one element M3 selected from Si, Al, Zr, and B.

7. A solid electrolyte layer comprising the sulfide solid electrolyte according to claim 1.

8. A lithium-ion secondary battery comprising the sulfide solid electrolyte according to claim 1.

* * * * *